(12) United States Patent
Lilleberg et al.

(10) Patent No.: US 6,411,186 B1
(45) Date of Patent: Jun. 25, 2002

(54) DELAY ESTIMATION METHOD AND A RECEIVER

(75) Inventors: Jorma Lilleberg; Esko Nieminen, both of Oulu (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/214,801

(22) PCT Filed: Jul. 11, 1997

(86) PCT No.: PCT/FI97/00446

§ 371 (c)(1),
(2), (4) Date: Jan. 11, 1999

(87) PCT Pub. No.: WO98/02967

PCT Pub. Date: Jan. 22, 1998

(30) Foreign Application Priority Data

Jul. 12, 1996 (FI) .................................................. 962845

(51) Int. Cl.[7] .............................................. H04B 7/216

(52) U.S. Cl. ........................ 335/252; 375/347; 455/502

(58) Field of Search ................................ 370/229, 230,
370/231, 235, 238, 320, 335, 441, 508,
517, 519, 248; 375/267, 348; 455/132,
133, 502, 503, 504, 506

(56) References Cited

U.S. PATENT DOCUMENTS

| | | | | |
|---|---|---|---|---|
| 5,218,621 A | * | 6/1993 | Cudak et al. ................ | 375/232 |
| 5,231,648 A | * | 7/1993 | Driedger et al. ............ | 375/231 |
| 5,257,257 A | | 10/1993 | Chen et al. .................... | 370/18 |
| 5,305,349 A | | 4/1994 | Dent .............................. | 375/1 |
| 5,394,391 A | | 2/1995 | Chen et al. .................... | 370/18 |

(List continued on next page.)

FOREIGN PATENT DOCUMENTS

| | | |
|---|---|---|
| EP | 0448069 A3 | 9/1991 |
| EP | 0711044 A2 | 5/1996 |
| EP | 0749215 A2 | 12/1996 |
| WO | WO 94/15427 | 7/1994 |
| WO | WO 95/24086 | 9/1995 |
| WO | WO 95/34140 | 12/1995 |
| WO | WO 96/24988 | 8/1996 |

OTHER PUBLICATIONS

"Introduction to Numerical Analysis", Stoer et al., Springer–Verlag, 1983, pp. 572–576.

"Numerical Methods For Least Square Problems", Ake Bjorck, Abstract of the publication.

"Linear Multiuser Detectors For Synchronous Code–Division Multiple Access Channels", V. Lupas, IEEE Transactions of Information Theory, vol. 35, No. 1, pp. 1234–136.

"Near–Far Resistance Of Multiuser Detectors In Asynchronous Channels", Lupas et al., IEEE Transactions on Communications, vol. 38, No. 4, pp. 496–508.

PCT International Search Report.

*Primary Examiner*—Ricky Ngo
*Assistant Examiner*—Phuc Tran
(74) *Attorney, Agent, or Firm*—Perman & Green, LLP

(57) ABSTRACT

A delay estimation method and a receiver in a radio system. Signals originate from one or several transmitters and propagate along several paths. One path (73–77) is selected at a time for estimation. The least squares minimization between the received signal and the code bank model is solved path by path (73–77) and delay by delay. The delay of only one selected path is changed at a time. Using the minimization results the delays of the other paths (73–77) remain unchanged. The minimization results establish the delay with the minimized result at most equal to the results for other delays. This delay is used as the constant value of the path (73–77) when the delays of the other paths are searched. The method provides the delays of all the paths (73–77) of all users simultaneously without information on user symbols or attenuation coefficients of the channel.

16 Claims, 2 Drawing Sheets

U.S. PATENT DOCUMENTS

| | | | |
|---|---|---|---|
| 5,408,504 A | 4/1995 | Ostman | 375/354 |
| 5,416,435 A | 5/1995 | Jokinen et al. | 327/113 |
| 5,420,889 A | 5/1995 | Juntti | 375/346 |
| 5,426,670 A | 6/1995 | Leppanen et al. | 375/343 |
| 5,440,597 A | 8/1995 | Chung et al. | 375/200 |
| 5,448,600 A * | 9/1995 | Lucas | 370/342 |
| 5,491,718 A | 2/1996 | Gould et al. | 375/205 |
| 5,533,013 A | 7/1996 | Leppanen | 370/18 |
| 5,548,616 A | 8/1996 | Mucke et al. | 375/295 |
| 5,550,893 A | 8/1996 | Heidari | 379/59 |
| 5,566,201 A | 10/1996 | Ostman | 375/200 |
| 5,589,795 A | 12/1996 | Latva-Aho et al. | 327/553 |
| 5,590,160 A | 12/1996 | Ostman | 375/367 |
| 5,596,571 A | 1/1997 | Gould et al. | 370/335 |
| 5,654,980 A | 8/1997 | Latva-Aho et al. | 375/208 |
| 5,715,279 A * | 2/1998 | Laakso et al. | 375/224 |
| 5,815,801 A * | 9/1998 | Hamalainen et al. | 370/335 |
| 5,838,669 A * | 11/1998 | Gerakoulis | 370/320 |

* cited by examiner

DELAY ESTIMATION METHOD AND A RECEIVER

FIELD OF THE INVENTION

The invention relates to a delay estimation method used in a radio system comprising as a transmitter and a receiver at least one base station and a subscriber terminal, in which system signals comprise waveforms and wherein a received or preprocessed signal is sampled and wherein the mutual delays are estimated from the received signals, which originate from one or several transmitters and which have propagated typically along several paths.

The invention also relates to a receiver arranged to be used in a radio system comprising as transmitters and receivers at least one base station and a subscriber terminal having signals that contain waveforms, in which system a receiver is arranged to sample a received or preprocessed signal and to estimate the mutual delays from the signals, which originate from one or several transmitters and which are typically muitipath signals that have propagated along several paths.

BACKGROUND OF THE INVENTION

In a radio system, after a signal has left the transmitter it is scattered into several parts as it propagates and therefore several copies of the same signal arrive at the receiver at slightly different times, since the copies have propagated at the same speed along different paths. The signal scattering varies depending on the environment, for example mountains, countryside, suburbs, city centre etc. The greater the scattering caused by the environment, the more paths are required for modelling one signal.

One of the central problems in designing and implementing data transmission systems is the simultaneous transmission and reception of signals of several simultaneous users so that the signals interfere with one another as little as possible. For this reason and due to the transmission capacity used, several different transmission protocols and multiple access methods, such as the code division multiple access (CDMA) method, have been developed.

CODMA is a multiple access method that is based on the spread spectrum technique and that has been recently applied in cellular radio systems in addition to the prior FMDA (frequency division multiple access) and TDMA (time division multiple access). CDMA has several advantages compared to the prior methods, such as simplicity of the frequency planning and spectral efficiency. In the following, the invention will be described when applied by way of example in a direct spreading CDMA system. The application of the invention to other systems, such as a digital car radio, is also possible.

In the direct spreading CDMA method, a narrow-band data signal of a user is multiplied to a relatively broad band with a spreading code having a considerably broader band than the data signal. Bandwidths used in known test systems include 1.25 MHz, 10 MHz and 25 MHz. In connection with multiplying, the data signal spreads to the entire band to be used. All users transmit simultaneously by using the same frequency band. A separate spreading code is used over each connection between the base station and a mobile station, and the user signals can be distinguished from one another at the receivers on the basis of the spreading code of each user. The spreading codes are preferably selected in such a way that they are mutually substantially orthogonal, i.e. they correlate with one another as little as possible.

Correlators provided in CDMA receivers implemented in a conventional manner are synchronized with a desired signal that is identified on the basis of the spreading code. The data signal is restored in the receiver to the original band by multiplying it again with the same spreading code that was used during the transmission. The signals that have been multiplied with some other spreading code do not ideally correlate and are thus not restored to the narrow band. Therefore they appear as noise for the detected signal. The scattering of the signals into a multipath signal and the signals of the other users complicate the detection of the desired signal by distorting the received signal.

The detection of the user symbols is possible when the connection between the transmitter and the receiver is synchronised, i.e. the signal delay is known. A prior art method is to use a conventional one-user delay estimator. This method works well only when certain boundary conditions apply, and since the implementation is simple its capacity is also insufficient. Successful synchronization typically requires advance information on the user symbols and the complex attenuation coefficients of the channel. Especially in asynchronous systems, i.e. systems where the signals of the users are not mutually synchronised, reliable signal reception is difficult since the user symbols are disturbed by several symbols of the other users. Filters adapted to spreading codes and sliding correlators used as detectors in conventional receivers are not effective, however. More effective known methods include multiuser detectors, e.g. a decorrelating detector that eliminates multiple access interference from the received signal by multiplying it with the cross-correlation matrix of the spreading codes used. A decorrelating detector and the known implementations thereof are described in greater detail in Linear multiuser detectors for synchronous code-division multiple access channels by Verdu Lupas, IEEE Transactions on Information Theory, vol 35, no. 1, pp 123–136, January 1989, and Near-far resistance of multiuser detectors in asynchronous channels, by Verdu Lupas, IEEE Transactions on Communications, vol 38, April 1990, which are incorporated herein by reference.

CHARACTERISTICS OF THE INVENTION

The purpose of the present invention is to provide a delay estimation method wherein delay estimates are formed simultaneously for all users and paths before the detection of user symbols and without information about the properties of the channel.

This is achieved with a method of the type disclosed in the preamble, characterized by determining the paths to be estimated, determining the code bank model to be used which contains information on the waveforms used, selecting one of the determined paths at a time for estimation, and with respect to these paths, solving the least squares minimization problem between the received signal and the code bank model such that the delay of only one selected path is changed at a time within the desired search interval while the delays of the other paths remain unchanged, so that delay-specific minimization results are formed, searching for a delay which corresponds to the minimization results and for which the minimized result is smaller than or equal to the results for the other delays of the same path, storing said delay which is the delay estimate that was searched for, and utilizing said delay as a constant value of said path when the delays of the other paths are searched for.

The receiver according to the invention is characterized in that the receiver comprises path model means, code bank model means and delay means, said delay means are arranged to receive a signal, information on the paths to be estimated from the path model means, and the code bank model from the code bank model means, said delay means are also arranged to carry out the following delay estimation procedures specifically for each path: solving the least squares minimization problem between the received signal and the code bank model of the code bank model means in order to provide minimization results, in which minimization problem the delays of only one path at a time are to be changed while the delays of the other paths remain unchanged, searching for a delay for which the minimization result is smaller than or equal to the results for the other delays of the same path, and storing said delay which is the delay estimate that was searched for, and using said delay as a constant value when the delays of the other paths are searched for.

The method according to the invention and the receiver applying the method provide considerable advantages. The delays of all the paths of all the users can be taken into account simultaneously. It is not necessary to know the user symbols and the complex attenuation coefficients of the channel when the delay estimates are formed. Also, known parameters can be taken into account and combined with the method.

DESCRIPTION OF THE DRAWINGS

In the following, the invention will be described in greater detail with reference to the examples according to the accompanying drawings, in which.

DESCRIPTION OF THE PREFERRED EMBODIMENTS

Figure 1:
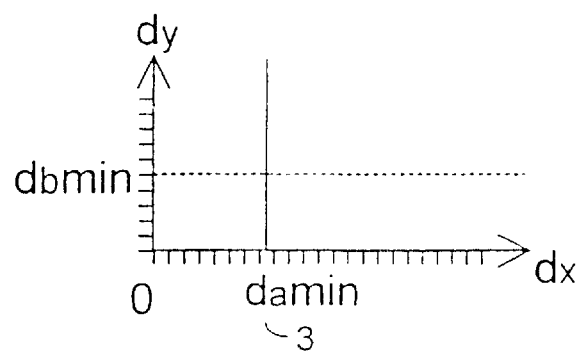
FIG. 1 shows a two-dimensional delay space.

The arrangement according to the invention can be applied especially in a CDMA system or in a digital car radio system without restricting the invention thereto, however. Examples of other systems where the invention can be applied include FDMA and TDMA systems, for example.

Examine now the arrangement according to the invention, applied mainly in a CDMA system. In the arrangement according to the invention, a signal that has been received and possibly preprocessed in some manner is sampled. The preprocessing may consist, for example, of analogous or digital filtration. The received sampled signal is examined during an observation interval extending over at least one data symbol, and the estimation of the received delays is carried out on the basis of this examination.

The reception method according to the invention can be applied in both a synchronous and an asynchronous system. The method is applicable for use regardless of the number of users or the number of the multipath-propagated signal components of each user.

The received asynchronous CDMA signal r(t) is generally of the form $$r(t) = \sum_{k=1}^{K(t)} \sum_{m=-M(k)}^{M(k)} \sum_{l=1}^{L(t,k)} \alpha_{klm} b_{km} s_k(t - mT - d_{klm}) + n(t), \quad (1)$$

wherein $\alpha_{klm}$ is complex channel attenuation, $b_{km}$ is a user bit or bit combination, $S_k(t)$ is the spreading code sequence/waveform of the user, $d_{klm}$ is a delay caused by asynchronicity, n(t) is noise and T is a symbol period. The number of the users K(t) is a function changing with time, M(k) is the number of the symbols to be transmitted and L(t,k) is the number of the received signal components that is dependent on time and the user, i.e. L(t,k) corresponds to the paths along which the signals have propagated. L(t,k) is a function of time since the number of the multipath-propagated signal components for different users varies in time. The same equation (1) can also be given in a matrix form $$r = S_d Ab + n, \quad (2)$$

wherein $b=(b_{km})$, $A=\text{diag}(a)$ is a diagonal matrix wherein $a=(\alpha_{klm})$, n is a noise term, and $S_d$ is the matrix of the spreading codes, i.e. a code bank model that is parametrized with a delay vector $d=(d1, d2, \ldots dp)$. It turns out that the delays d can be estimated by means of the following double minimization function:

$$d = \arg \min_d (\min_z |r - S_d z|) \quad (3)$$

Least squares minimization with respect to variable z can be carried out with any least squares method, which is described in greater detail in *Numerical Methods for Least Squares Problems* by Åke Björck, SIAM, Philadelphia, USA, 1996, which is incorporated herein by reference. Especially the Hesteness-Stiefel conjugate gradient method is advantageous in this case since it converges rapidly towards the solution. The Hesteness-Stiefel conjugate gradient method is described in greater detail in *Introduction to Numerical Analysis*, by J. Stoer and R. Bulirsch, Springer-Verlag, 1983, pp 572–576, which is incorporated herein by reference. The minimization with respect to the delays $d=(d1, d2, \ldots dp)$ is carried out by examining the delay alternatives dk=0, 1, ... (length of the sample sequence-1) of one path at a time and by selecting the minimizing delay.

A typical algorithm for solving a problem that is specific for a certain system is for example as follows:

Let A be the index set of all the predetermined paths of all the users, $A=\{1, 2, \ldots, p\}$, and assign $d=(d1, d2, \ldots dp)$, which is originally $d=0$. Let $S_d$ be the code bank model used, corresponding to the delays d.

1) Selecting one path, such as k, from the set of paths A;
2) Solving the following least squares problem for each $j=0, 1, 2, \ldots, cl_k-1$ $$\min_z |r - S_d z| = g(j),$$

wherein $d=(d1, d2, \ldots, dk, \ldots, dp)$, $dk=(j+dk_a) \mod cl_k$, and $dk_a$ is the original delay of the path k;
3) Finding $j_o$ having the property that $g(j) \geq g(j_o)$ for all $j=0, 1, 2, \ldots, cl_k-1$, and assigning $dk=(j_o+dk_a) \mod cl_k$;
4) Going through all the paths of A.

In the algorithm, $cl_k$ refers to the length of the signal sample sequence of the $k^{th}$ path since the signal is sampled at the sampling frequency. In the CDMA system, the path model determines the number of the paths of one spreading code, for example. The nonsimultaneity of the signal components that have propagated along different paths is monitored by means of the delays, which are to be estimated for each path in the path model. The code bank model determines the spreading codes to be used and their behaviour, for example their periodicity/non-periodicity. The code bank model also contains information on how the spreading code models the scattered signal that has propagated along the paths. In such a case, it is possible to model the multipath propagation of one code even though the CDMA signal contained several different spreading codes with their paths. The path can also be modelled with an incomplete signal model, i.e. parts of the code bank model can be left out.

The algorithm from step 1 to step 4 is carried out at least once so that in the iteration following the first time the delays d are given the values of the delays of the previous iteration round. When the algorithm is carried out once, the minimums of the strongest paths are found from the delay space during the execution of the minimization function. On the other hand, if the path is weak it is not necessarily located immediately, but when the algorithm is repeated it is also possible to find the weakest paths so that the required delays of the predetermined paths can be estimated.

The least squares solution can be estimated preferably with the Hesteness-Stiefel conjugate gradient algorithm (HS-CG algorithm) or the like. The conjugate gradient algorithm utilizes the results of the preceding or $n^{th}$ iteration round for the iteration (n+1). Otherwise the initial values of the HS-CH algorithm are zero. The spreading code is preferably the Gold code or the like.

Examine in greater detail the application of the method according to the invention to a radio system. A CDMA signal typically comprises several spreading codes on the same band and the signal generated by each spreading code may be scattered. The delays are to be estimated for the scattered signals corresponding to each spreading code. The code bank is used to model the manner of scattering and the properties of the spreading codes used, which are determined separately for each system. It should be emphasized specifically that the code bank model may be incomplete, i.e. it is not necessary that it includes at the same time all the spreading codes of the CDMA signal, but there may be for example only one spreading code and that may even be modelled in an incomplete manner. In other words, several different code bank models can be applied to the same CDMA signal from a perfect model to a model containing only one spreading code. In addition to the spreading codes, the delays and the path model also affect the structure of the code bank model.

The path model used determines how many paths the code bank contains for each spreading code, and the different spreading codes may have a different number of paths. The delay algorithm is given in a path-specific form: the delays are located separately for each path according to the total number of paths, and the spreading code or a part thereof required by the path model is used in connection with each path.

The code bank model and the path model to be used are selected for the received CDMA signal. Only the delays of the paths corresponding to the spreading codes in the code bank model are estimated. At the beginning, the delays of all the paths are set to zero unless more accurate information on the delay values is available. The delays are thereafter located path by path by shifting the delay of the path under examination from the initial value with one delay step at a time until all the desired delay values of the path have been examined and the least squares problem between the CDMA signal and the code bank model is solved for each delay under examination, The delay that corresponds to the value of the least square is assigned as the delay of the path. The delays of the paths other than the one under examination are kept constant, in other words only the delay of the path under examination is changed. All the paths are subjected to the aforementioned operation and preferably all the paths are examined at least once, and if the algorithm is carried out several times in succession the delays of the preceding round can be set as initial values for the next round. The above-described algorithm can be changed such that in the path model the delays of some paths are considered known and therefore the delays of these paths are not searched for when the algorithm is carried out.

FIG. 1 illustrates how the delay search takes place in the delay space. There are only two paths and the delay space is therefore only two-dimensional. The delay of the path $p_a$ is on the dx axis and the delay of the path $p_b$ is on the dy axis. The search is carried out preferably such that the delays of all the other paths except one are kept at a predetermined value. In such a case, the value of this one path, in this case $p_b$, is changed with respect to the delays of the other paths, in this case $p_a$. Let the fixed delay of the path $p_a$ be da. In such a case, the search through the delay space is started for example from the delay db=0 of the path $p_b$ and the process proceeds upwards in the figure until the other end of the code corresponding to path $p_b$ is reached. The important factor is not the starting and ending points but only the fact that the desired search area is examined by means of the algorithm. The minimums formed in step 2 of the algorithm correspond to kind of correlation where the smallest value corresponds to the best correlation. The smallest one of these minimums is selected in step 3 of the algorithm. In such a case, over the distance from the beginning to the end of the spreading code of path $p_b$, the minimization function obtains its smallest value with respect to the delay, i.e. this value is in the point db=dbmin. In a preferred embodiment of the invention, the movement in the delay space takes place only in the direction of the coordinate axes of the space, so that the function can be solved far more rapidly. If there are altogether 100 paths p and the symbol length m is 200, $m^p=200^{100}$ points must be examined in order to solve the function in the general form. When the movement takes place only in the direction of the coordinate axes of the delay space, the number of the points obtained is substantially less than previously, i.e. mp=200*100=20000.

Figure 2:
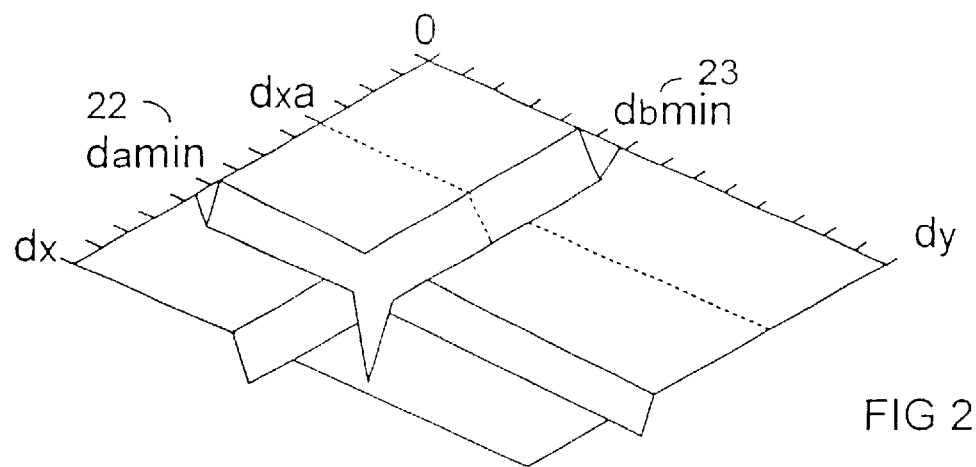
FIG. 2 shows a delay space and a correct delay location.

FIG. 2 shows a two-dimensional delay space and the behavior of function g related to the minimization problem in a three-dimensional manner with different delay combinations. Function g obtains small values zonally on the surface formed by the delay axes dx and dy. Examine the search for the delay of path $p_b$, For example starting from the point dxa in the direction of delay axis dy leads to a point dbmin=23 containing a lower zone typically along the width of two chips. When this zone has been located, the delay for the spreading code of this path is stored and it is thus possible to locate the zone of the smallest value of path $p_a$ in the direction of the delay axis dx, which value is found in the point damin 22. Therefore, the minimum value of function g for the paths $p_a$ and $p_b$ is found from the point $(d_a min, d_b min)=(22, 23)$, which also constitutes the solution to the minimization function in step 3 of the algorithm. Typically one minimum point $(d_a min, d_b min)$ of function g is dominant and the other points in the delay space obtain far greater values. However, it is usually useful to search for more delays of the signal paths. The CDMA system typically utilizes a band of 1.25 MHz, for example, and it enables preferably the use of three paths for one spreading code. More paths can be utilized on a greater frequency band.

Figure 3:
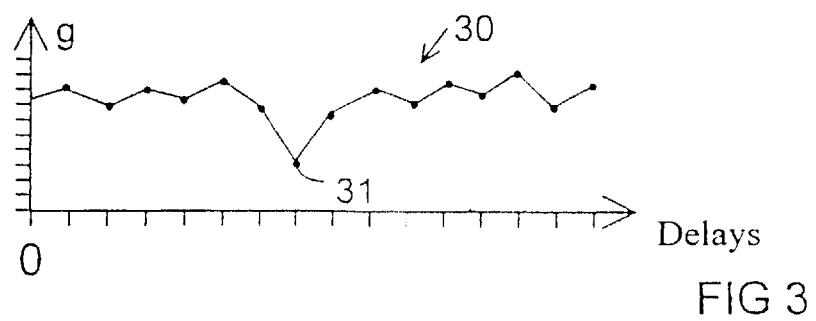
FIG. 3 shows the value of g with different delays as a function of the spreading code of one path.

FIG. 3 shows in greater detail the values $\min_z |r-S_d z| = g(j)$ with different delays. These values represent kind of correlation between the spreading codes of different paths. In the figure, the value of g is on the y axis and the path spreading code is on the x axis with the sampling accuracy. The value g obtains its minimum when the signal density function obtains its path-specific maximum value.

Figure 4:
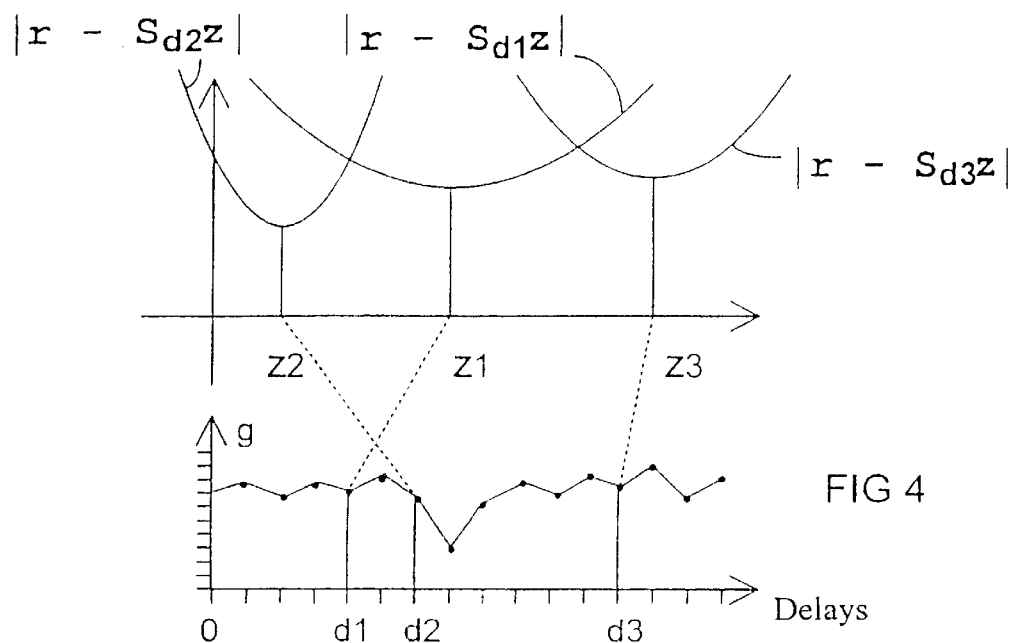
FIG. 4 shows a minimizing vector z and g with different delays.

FIG. 4 shows the vector z minimizing the least square, and the values g with different delays. When the delay of the spreading code is altered, the minimizing vectors $z_1$, $z_2$ and $z_3$ change and the corresponding minimum values are shifted to different points, for example $g(d_1)$, $g(d_2)$, $g(d_3)$. In such a manner, a minimizing vector and a minimum must be calculated separately for each path and delay in step 2 of the algorithm. The matrix $S_d$ is determined directly by means of the path model, the code bank model and the delays, and it models the paths of the spreading codes with the delays, In a multidimensional delay space, it is also possible that an exact delay estimate d is known for certain paths, in which case no minimization according to step 2 of the inventive algorithm is carried out for the delay axis in question.

Figure 5:
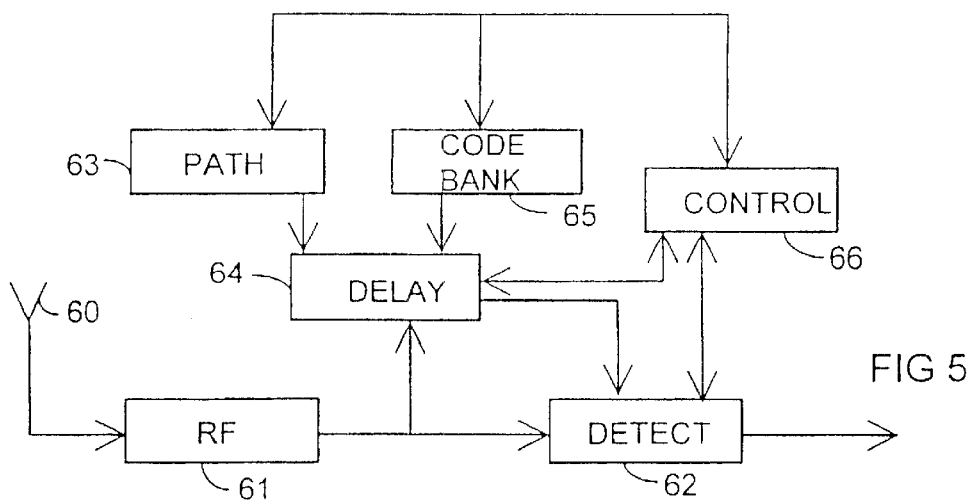
FIG. 5 shows a typical receiver structure.

FIG. 5 shows a typical receiver structure. The receiver comprises an antenna 60, radio-frequency means 61, detection means 62, delay means 64, path model means 63, code bank model means 65 and control means 66. Examine in greater detail the operation of the receiver according to the invention. The antenna 60 receives signals and the frequency thereof is converted into an intermediate frequency in the radio-frequency means 61 for example by multiplying the received signals with the frequency of the local oscillator and by deleting high frequencies through low-pass filtration. This intermediate-frequency signal propagates both to the detection 62 and to the delay means 64. In the detection 62, the intermediate-frequency signal is first converted into a digital signal in order to facilitate the detection and it is processed with digital signal-processing means. In such a case, the signal is for example demodulated and the transmitted bits are detected and, depending on the receiver, the detected bits are transmitted to the user or to other parts of the network. The delay means 64 in turn form delays according to the paths for different spreading codes by means of the method according to the invention, and the detector 62 utilizes the delays for example when it combines the multipath signals that have arrived along different paths. In multipath reception, the most common diversity receivers combine the signals before or after the detection and they include for example selective combining, maximal-ratio combining and equal-gain combining. The multipath signals are usually detected by means of Viterbi detection, in which case the signals are combined after the detection. However, it is most preferable to combine the signals before the detection since greater signal amplification is obtained in this manner. The delay means 64 utilize the information of the code bank model means 65 and the path model means 63 that are specific for each system. The contents of the path model means 63 are also dependent on the environment. For example in a city, the contents of the path model means 63 should be different from that in the countryside. The path model typically refers to the number of paths per spreading code. The code bank model means 65 contain data on the spreading codes used, the manner of scattering and the possible periods of the codes, and on how each path is modelled. The contents of both the code bank model means and the path model means can be changed according to the situation, environment and needs. The control means 66 control the operation of the receiver.

The receiver can be implemented by utilizing components and parts that are commonly used in radio systems. The antenna 60 is a conventional prior art antenna containing one or several components. The radio-frequency means 61 comprise conventional radio-frequency electronics. The digital signal-processing means 62 to 66 can be implemented with ASICs or VLSI circuits the operation or operation control of which is realized for example by means of software with microprocessor technology.

Figure 6:
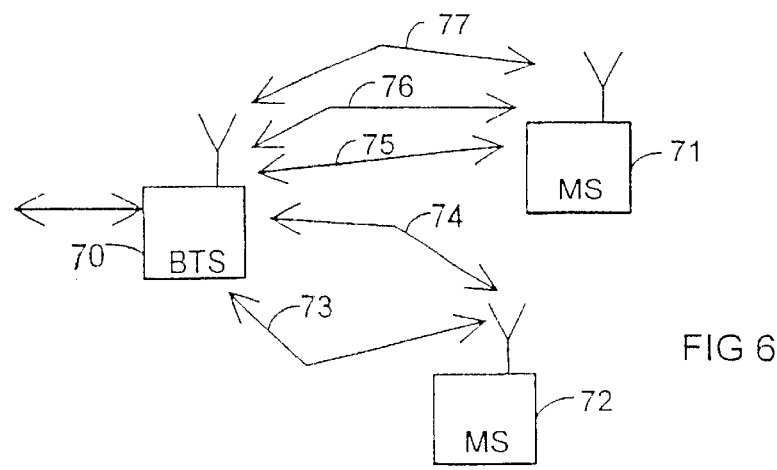
FIG. 6 shows a radio system.

FIG. 6 shows a typical radio system comprising a base station 70, subscriber terminals 71 and 72 and multipath signals on different paths 73 to 77. The base station 70 is connected to another network subsystem of the radio system (not shown in the figure). The network subsystem comprises for example at least one base station controller and a mobile services switching centre that is connected to other switching centres and other telephone systems or the like. The base station 70 and the subscriber terminals 71 and 72 comprise at least one transmitter and receiver. The subscriber terminals 71 and 72 are typically mobile phones that are used by subscribers or users. The bidirectional arrows in FIG. 6 mean that the subscriber terminals 71 and 72 and the base station 70 communicate via a bidirectional connection. In such a case, a signal from subscriber terminal 71, for example, may propagate along three different paths 75 to 77 to the base station 70. The different components of this signal that has propagated along three paths 75 to 77 probably have different delays at the base station 70 due to the different lengths of travel. In the method according to the invention, the delays of all the paths 73 to 77 of the signals of all the users 71 and 72 are thus formed simultaneously in the receiver of the base station 70 before the receiver 70 has information on the channel properties or the contents of the user signals.

In the method according to the invention, one user may employ several spreading codes that are of different length and that recur for example periodically or change constantly.

The method according to the invention is also applicable to radio systems other than those utilizing an actual spreading code. The spreading code is only one example of a signal waveform that represents a unit to which is added coded information formed of bits or bit combinations. In the CDMA system, a spreading code assumes the function of the waveform, whereas the TDMA system employs four different waveform alternatives. The waveforms are specific for each system. The method according to the invention is not dependent on the radio system, but it is essential in the method to know the waveforms used for the data transmission. As is well known, in digital data transmission the used waveforms and the manner in which they are used are known.

In the preferred embodiment of the invention, the different paths can be estimated simultaneously in parallel processes so that the estimation can be expedited. The estimation can also be expedited by determining that the delays between at least some paths are constant, in which case the determination of the delay of one path makes it possible to model the delays of all these paths and the delays of these paths are thus changed simultaneously in the search.

Even though the invention is described above with reference to the example according to the accompanying drawings, it is clear that the invention is not restricted thereto but it can be modified in several ways within the scope of the inventive idea disclosed in the appended claims.

What is claimed is:

1. A delay estimation method used in a radio system comprising as a transmitter and a receiver at least one base station and a subscriber terminal, in which system signals comprise waveforms and wherein a received or preprocessed signal is sampled at a sampling frequency and wherein the mutual delays are estimated from the received signals, which originate from one or several transmitters and which have propagated typically along several paths, comprising the steps of:

determining the paths on which the delays are to be estimated, determining a code bank model to be used which contains information on the waveforms used, selecting one of the determined paths at a time for delay estimation, and with respect to these paths, searching for delay estimates by solving the least squares minimization problem between the received signal and the code bank model such that the delay of only one selected path is changed at a time within a desired search interval while the delays of the other paths remain unchanged, so that delay specific minimization results are formed from said solving of the least squares minimization problem, storing the delay estimate for the path that was searched for, and utilizing said delay estimate as a constant value of said path when searching for the delays of the other paths.

2. A method according to claim 1, wherein the step of searching for delay estimates is carried out at least twice, and the delays estimated during the first carrying out of the search are utilized during the second carrying out of the search.

3. A method according to claim 1, wherein the step of solving the least squares minimization problem between the received signal and the code bank model is carried out by means of the Hestenes-Stiefel conjugate gradient algorithm.

4. A method according to claim 1, wherein the delays of the different paths are determined with the accuracy of the interval of the sampling frequency.

5. A method according to claim 1, wherein when the delays of some paths are known, only the unknown delays of the paths are estimated.

6. A method according to claim 1, wherein when the radio system is a CDMA system or a like system having a spreading code, and when the spreading code corresponds to the waveform, the Gold code is used as the spreading code.

7. A method according to claim 1, further comprising the step of providing a path model and wherein a model that can be changed is used as the path model.

8. A method according to claim 1, wherein a model that can be changed is used as the code bank model.

9. A receiver arranged to be used in a radio system comprising as transmitters and receivers at least one base station and a subscriber terminal having signals that contain waveforms, in which system a receiver is arranged to sample at a sampling ferquency a received or preprocessed signal and to estimate the mutual delays from the signals which originate from one or several transmitters and which are typically multipath signals that have propagated along several paths, wherein the receiver comprises:

means for providing a path model, means for providing a code bank model, and means for determining a delay, said delay means being arranged to receive:

a signal, information on the paths to be estimated from the path model means, and the code bank model from the code bank model means, said delay means also comprising means, arranged to carry out the following delay estimation procedures specifically for each path, comprising:

means for solving the least squares minimization problem between the received signal and the code bank model of the code bank model means in order to provide minimization results, in which minimization problem the delays of only one path at a time are to be changed while the delays of the other paths remain unchanged, means for searching for a delay for which the minimization result is smaller than or equal to the results for the other delays of the same path, and means for storing said delay which is the delay estimate that was searched for, and using said delay as a constant value when searching for the delays of the other paths.

10. A receiver according to claim 9, wherein the delay means are arranged to carry out the delay estimation method at least twice, in which case the delays estimated during the first carrying out of the method are utilized during the second carrying out of the method.

11. A receiver according to claim 9, wherein the delay means are arranged to use the Hestenes-Stiefel conjugate gradient algorithm to solve the least squares minimization problem between the received signal and the code bank model.

12. A receiver according to claim 9, wherein the delay means are arranged to determine the delays of the paths with an accuracy enabled by the sampling frequency.

13. A receiver according to claim 9, wherein, when the delays of some paths are known, the delay means are arranged to determine only the unknown delays of the paths.

14. A receiver according to claim 9, wherein the path model of the path model means can be changed.

15. A receiver according to claim 9, wherein the code bank model of the code bank model means can be changed.

16. A receiver according to claim 9, wherein, when the radio system is a CDMA system or a like system having a spreading code, the delay means are arranged to operate when the Gold code is used as the spreading code.

* * * * *